United States Patent [19]

Flatau

[11] Patent Number: 4,512,710
[45] Date of Patent: Apr. 23, 1985

[54] ROBOT FOREARM

[75] Inventor: Carl R. Flatau, Middle Island, N.Y.

[73] Assignee: Textron Inc., Providence, R.I.

[21] Appl. No.: 413,634

[22] Filed: Sep. 3, 1982

[51] Int. Cl.³ .............................................. B66C 23/00
[52] U.S. Cl. ..................................... 414/735; 74/640;
318/568; 414/5; 901/9; 901/15
[58] Field of Search ................. 414/735, 1, 4, 5;
901/9, 15, 20–29, 50; 74/640, 665 C; 318/568

[56] References Cited

FOREIGN PATENT DOCUMENTS

| 2851958 | 6/1979 | Fed. Rep. of Germany | 901/26 |
| 444633 | 10/1972 | U.S.S.R. | 414/5 |
| 882735 | 3/1980 | U.S.S.R. | 74/640 |

*Primary Examiner*—Robert J. Spar
*Assistant Examiner*—Donald W. Underwood
*Attorney, Agent, or Firm*—Mattern, Ware, Stoltz & Fressola

[57] ABSTRACT

A robot forearm has a pivotally mounted proximal end, a distal portion axially rotatable with respect to the remainder of the forearm, and a wrist connected to the distal portion and being angularly tiltable with respect thereto. A gear on the distal end of a first output shaft rotatably mounted in the remaining portion of the forearm drives a tilt gear assembly mounted in the distal portion of the forearm to tilt the wrist. A second output shaft concentric with the first shaft is connected to the distal portion of the forearm for imparting rotation thereto. Motors mounted in the forearm are coupled to the ouput shafts through concentric input shafts and harmonic speed reducing drives. The drives are axially spaced and concentric and are coupled to the output shafts by flexible cup-like members. Encoders connected to the second output shaft and the tilt gear assembly encode the position of those elements and produce corresponding feedback signals which are used to control the motors.

12 Claims, 3 Drawing Figures

ROBOT FOREARM

BACKGROUND OF THE INVENTION

This invention relates generally to robots and more particularly has reference to a robot forearm and drive assembly.

A robot typically includes a forearm which is pivotably connected to the robot body through an elbow mechanism. The end of the forearm remote from the elbow mechanism mounts a wrist mechanism which in turn mounts a tong mechanism. The wrist mechanism includes means for actuating, i.e., opening and closing, the tong mechanism. Means are further provided for imparting multiple degrees of freedom motion, such as pitch, yaw and roll, to the tong mechanism.

It is desirable that the forearm be provided with relatively rotatable and tiltable parts so that the wrist mechanism can be variously positioned and oriented with respect to the forearm. However, problems arise because the drive systems needed to actuate the relatively moveable parts are necessarily connected to those parts and subject to movement therewith. Actuation of a given drive system will cause relative movement of the parts and will consequently result in relative movement of components in other drive systems. This unintended activity in the other drive systems could result in unintended motions of the relatively moveable parts and could produce erroneous positioning or orientation of the wrist.

Means are thus needed for overcoming these problems.

Pertinent U.S. and foreign patents are found in Class 74, subclasses 804 and 805 and Class 414, subclasses 1-7 and 729-743 of the official classifications of patents in the United States Patent and Trademark Office.

The applicant is aware of no pertinent patents.

SUMMARY OF THE INVENTION

The present invention overcomes the problems outlined above.

The forearm of the present invention uses two axially spaced concentric harmonic drives to rotate a distal portion of the forearm with respect to the remainder of the forearm and to tilt a wrist pivotably connected to the distal portion of the forearm. Motors located in the forearm near the elbow mechanism drive pinions which in turn drive concentric input shafts connected to the harmonic drives. Concentric output shafts are coupled to the harmonic drives by cup-like flexible members to permit coaxial alignment of the input and output shafts. One output shaft is connected to the distal portion of the forearm to impart continuous rotation thereto. The other output shaft is connected to a tilt gear assembly, which includes bevel gears, a driver, an idler, and a driven gear, which is connected to the wrist for tilting the wrist.

Encoders connected to the output shafts and the tilt gear assembly encode the positions of those elements and produce corresponding feedback signals which are used to control the motors. Feedback control compensates for any effect that rotation of the distal forearm portion has upon tilt of the wrist and any effect that tilting of the wrist has upon angular position of the distal forearm portion.

Objects of the invention are, therefore, to provide an improved robot and to provide an improved robot forearm.

Another object of the invention is to provide a robot forearm having relatively rotatable and tiltable parts wherein means are provided for accurately driving the relatively moveable parts into desired positions and orientations.

Yet another object of the invention is to provide a robot forearm having a distal portion axially rotatable with respect to the remainder of the forearm and a wrist pivotably connected to the distal forearm portion.

Still another object of the invention is to provide drive systems for the relatively moveable parts of a robot forearm wherein the input and output shafts associated with the drive systems are concentric and coaxial.

A further object of the invention is to provide drive systems for the relatively moveable part of a robot forearm which include harmonic speed reducing drives. A still further object of the invention is to provide plural harmonic drives which are axially spaced and concentric with each other. Yet another object of the invention is to provide harmonic drives in which the driven gears are connected to the output shafts by cup-like flexible members.

Another object of the invention is to provide encoders for monitoring the positions of components in forearm drive systems and for producing feedback signals in response thereto which are used to control the drive motors powering the drive systems.

Yet another object of the invention is to provide robot forearm apparatus comprising a robot forearm having a proximal end and a distal end, pivotal mounting means connected to the proximal end for pivoting the forearm about the mounting means, axially rotatable means connected to a distal end of the forearm for axially turning with respect to a remainder of the forearm, angularly tiltable means connected to the axially rotatable means for tilting with respect to the axially rotatable means, first drive means connected to the axially rotatable means for rotating the axially rotatable means with respect to the remainder of the forearm, and second angularly tiltable means for tilting the angularly tiltable means with respect to the axially rotatable means.

Another object of the invention is to provide robot arm apparatus comprising a robot arm having a proximal end and a distal end, pivotal mounting means connected to the proximal end for pivoting the arm about the mounting means, axially rotatable means connected to a distal end of the forearm for axially turning with respect to a remainder of the forearm, angularly tiltable means connected to the axially rotatable means for tilting with respect to the axially rotatable means, first drive means connected to the forearm, a first drive shaft connected to the first drive means for turning by the first drive means, a first drive gear connected to the first drive shaft remote from the first drive means, a first driven gear surrounding the first drive gear and meshing therewith and having a greater number of teeth than the first drive gear whereby the first driven gear rotates at an angular rate less than an angular rate of rotation of the first drive gear, and a first driven shaft connected to the first driven gear for rotating therewith, the axially rotatable means being connected to the first driven shaft for being rotated thereby.

Still another object of the invention is to provide robot forearm drive apparatus for rotation of a distal forearm portion and for angular tilting of a wrist connected to the distal forearm portion comprising first and second drive means, first and second input shafts connected respectively to the first and second drive means, the first input shaft comprising a hollow outer shaft and the second input shaft comprising an inner shaft concentrically positioned within the outer shaft, first and second speed reducing drive means having respectively first and second input gears respectively connected to the first and second input shafts and having first and second output gears surrounding the first and second input gears in substantial circumferential contact therewith, the first and second output gears having greater numbers of teeth than the first and second input gears, first and second output shafts respectively connected to the first and second output gears of the speed reducing drive means, the first output shaft comprising a hollow outer output shaft and the second output shaft comprising an inner output shaft concentrically disposed within the outer output shaft, the distal forearm portion being connected to a distal end of the first output shaft for turning with the first output shaft, the wrist being pivoted to the distal forearm portion, and wrist tilt means connected between the second output shaft and the wrist for angularly tilting the wrist.

These and other and further objects and features of the invention are apparent in the disclosure which includes the above and below specification and claims and drawings.

DETAILED DESCRIPTION OF THE DRAWINGS

Figure 2:
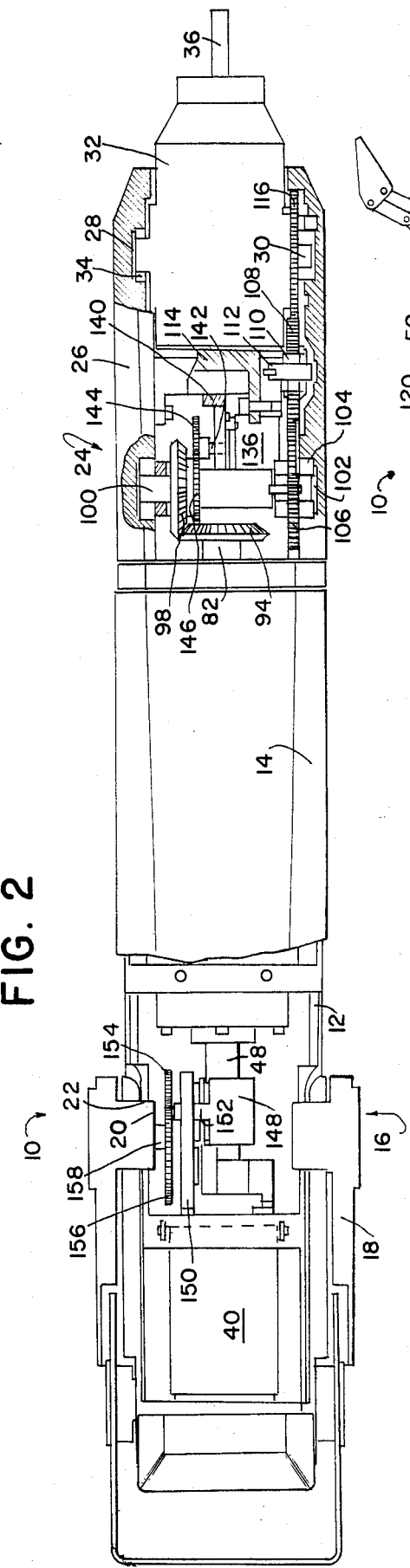
FIG. 2 is a top plan view, partly broken away, of the apparatus shown in FIG. 1.
Figure 1:
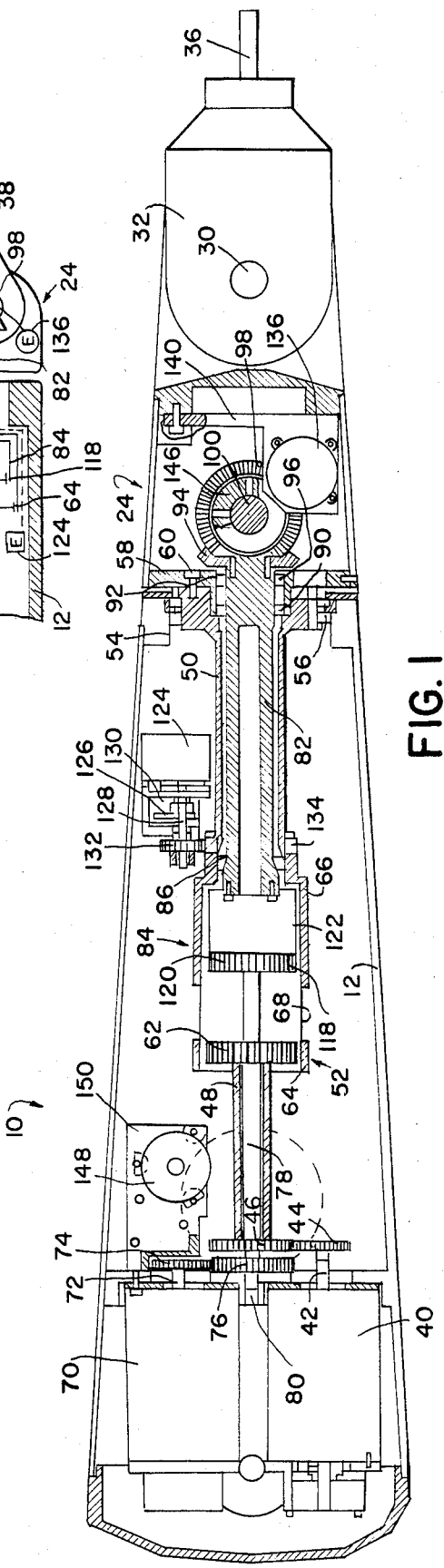
FIG. 1 is a side elevational view, in section, of a robot forearm embodying features of the present invention.

Referring to FIGS. 1 and 2, the robot forearm of the present invention is generally indicated by the numeral 10.

The body of the forearm 10 is formed by a longitudinally extending frame structure 12 and a cover 14. The drive systems described hereafter are mounted on the frame structure 12 and enclosed by the cover 14.

The forearm 10 is connected to a robot body (not shown) by an elbow mechanism. The elbow accommodates a main arm 16 which has a pair of transversely spaced-apart arm members 18 positioned on opposite sides of the forearm 10. Radially inwardly extending journals 20 formed on the ends of the arm members 18 are rotatably received in openings 22 formed in the proximal end of the forearm frame 12. The main arm 16 thus provides a pivotal support for the forearm 10.

The forearm 10 has a distal portion 24 which is separate from the remainder of the forearm 10. The distal portion 24 is axially aligned with the remainder of the forearm 10 and is connected to drive systems extending therethrough, in a manner more fully described later, so that it is rotatable with respect to the remainder of the forearm 10.

The distal forearm portion 24 includes a pair of longitudinally extending side plates 26 which have transversely aligned recesses 28 formed in their distal ends.

A pair of radially outwardly extending journals 30 formed on the housing of a wrist assembly 32 are received in the recesses 28 and rotatably supported therein by bearings 34. It will now be appreciated that the wrist assembly 32 is tiltable with respect to the distal forearm portion 24.

The wrist assembly 32, per se, forms no part of the present invention. A motor or other source of power (not shown) supplies rotational torque to a drive system (not shown) which communicates that torque to mechanisms within the wrist assembly 32. The mechanisms within the wrist assembly 32 apply that torque to a rotatable ball screw or nut 36 extending longitudinally from the distal end of the wrist 32. The ball screw or nut 36 cooperates with a corresponding ball screw or nut in a tong assembly (not shown) connected to the wrist 32 to convert rotational movement of the ball screw or nut 36 into tong open/close motions.

Figure 3:
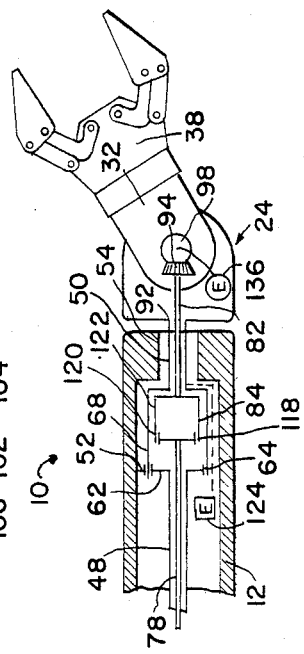
FIG. 3 is a simplified diagrammatic illustration of the view shown in FIG. 1.

A typical tong assembly 38 is shown in FIG. 3.

The drive systems for rotating the distal forearm portion 24 and for tilting the wrist 32 will now be described.

The rotate drive system includes a motor 40 mounted in the proximal end of the forearm 10. The rotatable motor shaft 42 extends longitudinally toward the distal end of the forearm 10 and terminates in a driver gear 44.

The driver gear 44 meshes with a transversely adjacent driven gear 46 connected to the proximal end of a hollow input drive shaft 48. The shaft 48 extends longitudinally through the forearm 10 in a direction generally parallel to the motor shaft 42.

The input shaft 48 is coupled to a hollow output driven shaft 50 by a harmonic drive 52. The input shaft 48 is coaxial with the output shaft 50. The distal end of the output shaft 50 extends through an opening 54 formed in the distal end of the proximal forearm portion and is rotatably supported therein by bearings 56. The proximal end plate 58 of the distal forearm portion 24 is connected to the distal end of the output shaft 50 by screws 60 so that rotation of the output shaft 50 is communicated to the distal forearm portion 24.

The harmonic drive 52 is a speed reducing assembly. A drive gear 62 is connected to the distal end of the input shaft 48. A driven ring gear 64 is concentrically disposed about the drive gear 62 for meshing engagement therewith. The driven gear 64 has a greater number of gear teeth than the drive gear 62 so that the driven gear 64 rotates at an angular rate less than the angular rate of rotation of the drive gear 62. The driven gear 64 is coupled to a diametrically enlarged longitudinal extention 66 of the output shaft 50 by a flexible cup-like member 68. The flexible member 68 allows the driven gear 64 to engage the drive gear 62 at a deflection point which travels a symetrical oval path around the input shaft 48 and output shaft 50.

Operation of the rotate drive system can now be readily understood.

The motor 40 rotates the motor shaft 42 at a relative high rate of speed. That rotation is communicated through the driver gear 44, driven gear 46 and input shaft 48 to the drive gear 62. The drive gear 62 cooperates with the driven gear 64 to act as a speed reducing drive. The driven gear 64 thus rotates about the drive gear 62 at a rate of speed which is relatively low as compared to the rate of speed of the drive gear 62. Rotation of the driven gear 64 is communicated through the flexible member 68 and output shaft 50 to the proximal end plate 58 of the distal forearm portion 24, thereby resulting rotation of the distal forearm portion 24 at a relatively slow rate of speed.

The tilt drive system includes a motor 70 mounted in the proximal end of the forearm 10. The rotatable motor shaft 72 extends longitudinally from the motor 70 toward the distal end of the forearm 10. A driver gear 74 is connected to the distal end of the motor shaft 72.

The driver gear 74 meshes with a transversely adjacent driven gear 76 connected to the proximal end of an input drive shaft 78 concentrically disposed within the input shaft 48 of the rotate drive system. The driven gear 76 of the tilt drive system is axially aligned with and proximally spaced from the driven gear 46 of the rotate drive system and is rotatably supported by a bearing support 80. The input shaft 78 extends from the tilt driven gear 76 through the driven gear 46, input shaft 48 and drive gear 62 of the rotate drive system and is coupled to an output driven shaft 82 by a harmonic drive 84.

The output shaft 82 is concentrically disposed within the output shaft 50 of the rotate drive system and is rotatably supported therein by bearings 86 and 90. The proximal end of the output shaft 82 extends slightly into the longitudinal extension 66 of the rotate output shaft 50 and is coupled to the harmonic drive 84. The distal end of the output shaft 82 extends through the distal end of the rotate output shaft 50 and through a central opening 92 formed in the end plate 58 of the distal forearm portion 24 and terminates in a bevel gear driver 94 positioned within the distal forearm portion 24. The distal end of the output shaft 82 is rotatably supported in the end plate 58 by bearings 90 and 96.

The bevel gear driver 94, which rotates about the longitudinal axis of the forearm 10, meshes with a driven bevel gear 98 connected to an end of a shaft 100 which extends transversely across the distal forearm portion 24 in a direction perpendicular to the output shaft 82. The ends of the shaft 100 are received in aligned recesses 102 formed in proximal portions of the side plates 26 and are rotatably supported therein by bearings 104.

An input spur gear 106 connected to the end of the shaft 100 remote from the driven bevel gear 98 meshes with an idler spur gear 108 rotatably supported by bearings 110 mounted on a shaft 112. The shaft 112 is connected to a frame member 114 within the distal forearm portion 24 and extends transversely in a direction generally parallel to the shaft 100. The idler spur gear 108 meshes with a driven spur gear 116 rigidly connected to one of the outwardly extending journals 30 of the wrist 32.

The harmonic drive 84 in the tilt drive system is similar to the harmonic drive 52 in the rotate drive system. A drive gear 118 positioned within the diametrically enlarged longitudinal extension 66 of the rotate output shaft 50 is connected to the distal end of the tilt input drive shaft 78. A driven ring gear 120 concentrically disposed about the drive gear 118 for meshing engagement therewith and concentrically disposed within the longitudinal extension 66 has a greater number of gear teeth than the drive gear 118 whereby the driven gear 120 can rotate at an angular rate less than the angular rate of rotation of the drive gear 118. The driven gear 120 is connected to the proximal end of the output shaft 82 by a flexible cup-like member 122. Operation of the tilt harmonic drive 84 is identical to the operation of the rotate harmonic drive 52 described earlier.

Operation of the tilt drive system can now be readily understood.

The motor 70 drivingly rotates the motor shaft 72 at a relatively high rate of speed. That rotation is communicated through the driver gear 74, the driven gear 76 and the input shaft 78 to the drive gear 118 in the harmonic drive 84. The drive gear 118 meshes with the driven gear 120 to cause rotation thereof at a relatively low rate of speed. Rotation of the driven gear 120 is communicated through the flexible member 122 and the output shaft 82 to the bevel gear driver 94. Rotation of the bevel gear driver 94 is communicated through the driven bevel gear 98, shaft 100, input spur gear 106 and idler spur gear 108 to the driven spur gear 116. The outwardly extending journal 30 of the wrist 32 is rigidly connected to the driven spur gear 116 and rotates therewith at a relatively low rate of speed. Rotation of the journal 30 causes the wrist 32 to angularly tilt with respect to the distal forearm portion 24.

The simplified diagrammatic illustration of FIG. 3 clearly shows the unique arrangement of the rotate harmonic drive 52 and the tilt harmonic drive 84. The drives are axially spaced, concentric and coaxial. That arrangement results in compact drive systems and produces a desirably slim forearm 10.

Although the rotate drive system and the tilt drive system have been described as including a plurality of gears, it is understood that gears can be replaced by any type of geared connections such as pulleys or toothed wheels. It is also understood that the motors which power the drive system can be mounted outside the forearm or remote therefrom if desired. It is further understood that the harmonic drives can be replaced by any other type of conventional speed reducers, if desired.

From the foregoing description it will be appreciated that the rotate drive system and the tilt drive system are basically independent of each other but tend to work against each other. A portion of the tilt drive system is mounted in the distal forearm portion 24, the rotational orientation of said distal forearm portion 24 being controlled by the rotate drive system. Rotational movement of the distal forearm portion 24 tends to change the position of the tilt drive components mounted thereon relative to the tilt drive components mounted in the remainder of the forearm and thus tends to cause a change in the tilt of the wrist 32. Similarly, actuation of the tilt drive system causes an interaction between the bevel gear driver 94 and driven bevel gear 98 which results in the application of a tangential force to the distal forearm portion 24, said force tending to cause rotation of the distal forearm portion 24. Left unattended, this tendency of the drive systems to work against each other could result in unintended and undesirable motions of the wrist 32 and distal forearm portion 24.

The present invention overcomes this problem by providing means for sensing the instantaneous positions and orientations of the distal forearm portion 24 and wrist 32 and for generating feedback signals in response thereto. The feedback signals are used to control the motors powering the drive systems so that the drive systems operate against each other in a manner which insures the proper position and orientation of the distal forearm portion 24 and wrist 32.

The instantaneous rotational orientation of the distal forearm portion 24 is determined by a sequential encoder 124 mounted in the forearm 10 adjacent the rotate output shaft 50. A sequential encoder is a known and readily available electro-mechanical device which produces electrical output signals indicative of the instantaneous position or orientation of a mechanical component.

The mechanical component of the encoder 124 is a rotatable shaft (not shown) having a gear (not shown) connected thereto. The gear meshes with a gear 126 connected to the distal end of a shaft 128 rotatably mounted in a bracket 130 extending inwardly from the forearm frame 12. The shaft 128 extends longitudinally in a direction generally parallel to the output shafts 50 and 82 of the drive systems. A gear 132 connected to the proximal end of the shaft 128 meshes with an encoder drive gear 134 connected to the rotate output shaft 50 adjacent the proximal end of the longitudinal extension 66 of the shaft 50.

Because the output shaft 50 is directly connected to the distal forearm portion 24, the rotational orientation of the output shaft is directly indicative of the rotational orientation of the distal forearm portion 24. A change in the rotational orientation of the output shaft 50 causes a change in the rotational orientation of the encoder drive gear 134, which change is communicated through the gear 132, shaft 128, and gear 126 to the rotatable shaft (not shown) of the encoder 124. The change in the rotational orientation of the encoder shaft causes a change in the encoder output signal which is indicative of the change in the rotational orientation of the distal forearm portion 24.

The output signals from the encoder 124 are communicated to a control circuit (not shown) which controls the power supplied to the rotate motor 70. Such control circuits are well known. They typically include a first input for receiving a signal indicative of the desired rotational orientation of the distal forearm portion 24, a second input for receiving the feedback signal from the encoder 124, a comparator which compares the two input signals and produces a control signal based upon that comparison, and a controlable power circuit which receives the control signal and produces a magnitude and polarity of motor driving power which, when applied to the motor 70, will actuate the rotate drive system in a manner tending to reduce the control signal to a zero level.

The tilt of the wrist 32 is determined by a sequential encoder 136 mounted on a transverse bracket 140 in the distal forearm portion 24 proximally adjacent the wrist 32. The tilt encoder 136 is identical to the rotate encoder 124.

The encoder shaft 142 extends in a transverse direction generally parallel to the rotatable tilt shaft 100 mounted in the distal forearm portion 24. A gear 144 connected to the end of the encoder shaft 142 meshes with an encoder drive gear 146 fixed to the tilt shaft 100 adjacent the driven bevel gear 198.

Because the tilt shaft 100 forms a part of the drive system controlling the tilt of the wrist 32, the rotational orientation of the shaft 100 is indicative of the tilt of the wrist 32. A change in the rotational orientation of the shaft 100 results in a change in the rotational orientation of the encoder drive gear 146. This change is communicated through the gear 144 to the encoder shaft 142. The change in the rotational orientation of the encoder shaft 142 causes a corresponding change in the encoder output signal. The encoder output signal is applied to a control circuit similar to the one described with respect to the rotate encoder 124 and is thereby used to control the magnitude and polarity of power provided to the tilt motor 40 so as to produce a desired tilt to the wrist 32.

It will be appreciated that the motor control provided by the encoders 124 and 136 compensates for the fact that the drive systems work against each other and enables those drive systems to produce desired orientation of the distal forearm portion 24 and wrist 32. For example, a movement command given to the tilt motor 40 produces a rotation of the bevel gear driver 94 which results in the application of a tangential rotational force to the distal forearm portion 24. This force tends to rotate the output shaft 50, which rotation is sensed by the rotate encoder 124. The rotate control circuit will recognize that the encoder output signal is not indicative of the desired rotational orientation of the distal forearm portion 24 and will drive the rotate motor 70 in a manner which will tend to urge the distal forearm portion 24 to return to the desired rotational orientation. Consequently, the tilt drive system is allowed to act as if it was mounted entirely on the stationary portion of the forearm 10. The desired tilt motion is thus produced.

A corresponding sequence of the events and results occurs when a movement command is given to the rotate drive motor.

It will be noted from FIGS. 1 and 3 that the encoders 124 and 136 sense the rotational orientation of drive system components on the output sides of the harmonic drives 52 and 84 to control drive motors 40 and 70 on the input sides of the harmonic drives 52 and 84. The presence of speed reducers interposed between the drive motors 40 and 70 and the sensed drive system components facilitates accurate feedback control of the motors 40 and 70.

Changes in the feedback signals from the encoders 124 and 136 produce relatively large changes in the rotational orientations of the motor shafts 42 and 72. Given percentage changes in the rotational orientations of the motor shafts 42 and 72 result in identical percentage changes in the rotational orientations of the output shafts 50 and 82. However, because the harmonic drives 52 and 84 convert relatively large rotational movements of the motor shafts 42 and 72 into relatively small rotational movements of the output shafts 50 and 82, the changes in the absolute rotational positions of the shafts 50 and 82 will be much smaller than the changes in the absolute rotational positions of the motor shafts 42 and 72. Hence, fine control of the output shafts 50 and 82 can be obtained with coarse control of the drive motors 40 and 70.

A third encoder 148 mounted on a bracket 150 adjacent the openings 22 in the forearm frame 12 determines the pivotal orientation of the forearm 10 with respect to the main arm 16. The encoder shaft 152 extends in a transverse direction generally parallel to the radially inwardly extending journals 20 of the main arm 16. A gear 154 connected to the end of the encoder shaft 152 meshes with a gear 156 connected to the end of a radially inwardly extending shaft 158 connected to the journal 20. Relative movement between the forearm 10 and main arm 16 causes relative movement between the gear 156 and gear 154, resulting in rotation of the encoder shaft 152 and a change in the encoder output signals. The encoder output signals are communicated to a control circuit (not shown) similar to those used with the rotate and tilt encoders 124 and 136 to control a motor (not shown) which drives means for adjusting pivotal orientation of the forearm 10 with respect to the main arm 16.

It is understood that the encoders can be replaced by any conventional position transducer, if desired.

While the invention has been described with reference to specific embodiments, the exact nature and scope of the invention is defined in the following claims.

I claim:

1. Robot arm apparatus comprising a robot arm having a proximal end and a distal end, pivotal mounting means connected to the proximal end for pivoting the arm about the mounting means, axially rotatable means connected to a distal end of the forearm for axially turning with respect to a remainder of the forearm, angularly tiltable means connected to the axially rotatable means for tilting with respect to the axially rotatable means, first drive means connected to the forearm, a first drive shaft connected to the first drive means for turning by the first drive means, first drive gear means connected to the first drive shaft remote from the first drive means, first driven gear means surrounding the first drive gear means and meshing therewith and having a greater number of teeth than the first drive gear means whereby the first driven gear means rotates at an angular rate less than the angular rate of rotation of the first drive gear means, and a first driven shaft connected to the first driven gear means for rotating therewith, the axially rotatable means being connected to the driven shaft for being rotated thereby, second drive means connected to the forearm, a second drive shaft connected to the second drive means for turning by the second drive means, second drive gear means connected to the second drive shaft remote from the second drive means, second driven gear means surrounding the second drive gear means and meshing therewith and having a greater number of teeth than the second drive gear means whereby the second driven gear means rotates at an angular rate less than the angular rate of rotation of the second drive gear means, and a second driven shaft connected to the second drive gear means for rotating therewith, the angular tiltable means being drivingly interconnected to the second shaft for being actuated thereby, the first and second drive shafts being concentric, the first drive shaft being a hollow drive shaft and the second drive shaft being concentrically mounted within the first drive shaft and extending outward therefrom at opposite ends thereof.

2. The robot arm apparatus of claim 1 wherein the first and second driven shafts are concentric.

3. The robot arm apparatus of claim 1 wherein the first and second driven shafts are concentric, the first driven shaft being hollow and the second driven shaft being concentrically mounted within the hollow first driven shaft and being rotatably supported therein.

4. The robot arm apparatus of claim 1 further comprising a flexible cup-like means connected between the second driven gear means and the second driven shaft for flexing as the second driven gear means is turned by the second drive gear means, the flexible means being connected to the second driven shaft, whereby the second driven shaft may be coaxially mounted with respect to the second drive shaft.

5. The robot arm apparatus of claim 1 further comprising a flexible cup-like means connected between the first driven gear means and the first driven shaft for flexing as the first driven gear means is turned by the first drive gear means, the flexible means being connected to the first driven shaft, whereby the first driven shaft may be coaxially mounted with respect to the first drive shaft.

6. Robot forearm drive apparatus for rotation of a distal forearm portion and for angular tilting of a wrist connected to the distal forearm portion comprising first and second drive means, first and second input shafts connected respectively to the first and second drive means, the first input shaft comprising a hollow outer shaft and the second input shaft comprising an inner shaft concentrically positioned within the outer shaft, first and second speed reducing drive means having respective first and second input gear means respectively connected to the first and second input shafts and having first and second output gear means surrounding the first and second input gear means in substantial circumferential contact therewith, the first and second output gear means having greater numbers of teeth than the first and second input gear means, first and second output shafts respectively connected to the first and second output gear means of the speed reducing drives, the first output shaft comprising a hollow outer output shaft and the second output shaft comprising an inner output shaft concentrically positioned within the outer output shaft, the distal forearm portion being connected to a distal end of the first output shaft for turning with the first output shaft, the wrist being pivoted to the distal forearm portion, and wrist tilt means connected between the second output shaft and the wrist for angularly tilting the wrist.

7. The robot forearm apparatus of claim 6 further comprising position transducer means connected to at least one of the drive means for determining status of the drive means.

8. The robot forearm apparatus of claim 7 wherein the position transducer means comprises first position transducer means connected to the first drive means for determining status of the first drive means and second position transducer means connected to the second drive means for determining status of the second drive means.

9. The robot forearm apparatus of claim 8 wherein the second drive means comprises a second output shaft mounted in the forearm and second output gear means mounted at a distal end of the second output shaft and tilting gear means connected to the second output gear means and to the angularly tiltable means and wherein the second position transducer is connected to the tilting gear means for determining status of tilting gear means.

10. The robot forearm apparatus of claim 8 wherein the second output means comprises a second output forearm portion mounted in the forearm and a second output tilting portion connected between the second output forearm portion and the angularly tiltable means and wherein the second position transducer means is connected to the tilting portion of the second drive means for determining status of the tilting portion.

11. The robot forearm apparatus of claim 7 wherein the second drive means comprises a first portion mounted in the forearm and a second portion mounted in the axially rotatable means and connected to the first portion and wherein the position transducer means comprises tilt transducer means connected to the second portion and connected to the axially rotatable means for indicating the status of the second portion with respect to the axially rotatable means.

12. The robot forearm apparatus of claim 7 wherein the position transducer means produce feedback signals which are communicated to control means, said control means being operatively connected to the drive means for controlling said drive means.

* * * * *